United States Patent
Chun et al.

(10) Patent No.: US 8,922,073 B2
(45) Date of Patent: Dec. 30, 2014

(54) ELECTRIC MOTOR AND ELECTRIC VEHICLE HAVING THE SAME

(75) Inventors: Kwangwook Chun, Seoul (KR); Jaeho Kim, Seoul (KR); Yunho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 204 days.

(21) Appl. No.: 13/455,701

(22) Filed: Apr. 25, 2012

(65) Prior Publication Data

US 2012/0274158 A1 Nov. 1, 2012

(30) Foreign Application Priority Data

Apr. 27, 2011 (KR) .................. 10-2011-0039746

(51) Int. Cl.
| | | |
|---|---|---|
| H02K 9/19 | (2006.01) | |
| H02K 11/00 | (2006.01) | |
| B60L 3/00 | (2006.01) | |
| B60L 11/18 | (2006.01) | |

(52) U.S. Cl.
CPC ............ *H02K 11/0073* (2013.01); *B60L 3/003* (2013.01); *B60L 3/0061* (2013.01); *B60L 11/1803* (2013.01); *B60L 11/1877* (2013.01); *H02K 9/19* (2013.01); *B60L 2240/36* (2013.01); *Y02T 10/7005* (2013.01); *Y02T 10/705* (2013.01); *Y02T 10/641* (2013.01)
USPC .................................. 310/53; 310/54; 310/52

(58) Field of Classification Search
CPC ........ H02K 9/19; H02K 9/24; H02K 11/0073
USPC ................................................. 310/52, 53, 54
See application file for complete search history.

(56) References Cited

U.S. PATENT DOCUMENTS

| | | | | |
|---|---|---|---|---|
| 5,111,090 | A | * | 5/1992 | Otake et al. ..................... 310/54 |
| 6,104,113 | A | * | 8/2000 | Beifus ......................... 310/68 B |
| 6,160,332 | A | * | 12/2000 | Tsuruhara ....................... 310/54 |
| 6,317,963 | B1 | * | 11/2001 | Powers et al. ................... 29/596 |
| 7,414,339 | B2 | * | 8/2008 | Kitamura et al. ........... 310/68 D |
| 7,888,828 | B2 | * | 2/2011 | Takahashi et al. .............. 310/54 |
| 2004/0090130 | A1 | | 5/2004 | Kaneko et al. |
| 2004/0124722 | A1 | * | 7/2004 | Uchida et al. ................... 310/54 |
| 2004/0164625 | A1 | * | 8/2004 | Grundl et al. ................... 310/16 |
| 2007/0035270 | A1 | * | 2/2007 | Kitamura et al. ............. 318/727 |
| 2009/0261668 | A1 | * | 10/2009 | Mantere ......................... 310/54 |

FOREIGN PATENT DOCUMENTS

| | | | |
|---|---|---|---|
| JP | 2003-324900 A | 11/2003 | |
| JP | 2004-236470 A | 8/2004 | |
| JP | 2005253184 A | * 9/2005 | ............. H02K 11/00 |

(Continued)

OTHER PUBLICATIONS

Translation of foreign document KR 1020100079519 (Year: 2010).*

(Continued)

*Primary Examiner* — Alex W Mok
(74) *Attorney, Agent, or Firm* — McKenna Long & Aldridge LLP

(57) ABSTRACT

An electric motor includes a stator, a rotor disposed to be rotatable with respect to the stator, and a cooling unit including a cooling fluid and disposed between the stator and the inverter device to cool the stator and the inverter device. Weight can be reduced, and thus, power consumption of a battery can be reduced and a traveling distance of the vehicle can be increased.

17 Claims, 9 Drawing Sheets

(56) References Cited

FOREIGN PATENT DOCUMENTS

| JP | 2006-74962 A | 3/2006 |
| KR | 10-2003-0081524 A | 10/2003 |
| KR | 10-2005-0036904 A | 4/2005 |
| KR | 10-2006-0009858 A | 2/2006 |
| KR | 10-2010-0079519 A | 7/2010 |

OTHER PUBLICATIONS

Translation of foreign document JP 2004236470 A (Year: 2004).*
Translation of foreign document JP 2006074962 A (Year: 2006).*

* cited by examiner

ELECTRIC MOTOR AND ELECTRIC VEHICLE HAVING THE SAME

The present disclosure relates to subject matter contained in priority Korean Application No. 10-2011-0039746, filed on Apr. 27, 2011, which is herein expressly incorporated by reference in its entirety.

FIELD OF THE INVENTION

The present invention relates to an electric motor and an electric vehicle having the same, and more particularly, to an electric motor capable of reducing an installation space and weight, and an electric vehicle having the same.

DESCRIPTION OF THE RELATED ART

Recently, due to an environmental pollution resulting from an exhaust gas of vehicles, depletion of fossil fuel, and the like, electric vehicles or a hybrid vehicles (referred to as 'electric vehicles', hereinafter) using an electric motor as a power source or an auxiliary power source are on the rise.

Electric vehicles may include a battery for supplying power to the electric motor. The battery may be configured as a rechargeable secondary battery.

The electric motor provided in the electric vehicle may be configured as a 3-phase AC electric motor driven by 3-phase AC power.

To this end, the electric vehicle may include an inverter device for converting power applied from the battery into high frequency AC power (which is higher than commercial power frequency) and providing the converted AC power to the electric motor.

However, in the related art electric vehicle, since the electric motor and the inverter device are separately fabricated, cooling units for cooling the electric motor and the inverter device are separately fabricated and installed, resulting in a great deal of costs and efforts in the fabrication and installation of the cooling units.

Also, since the cooling units are separately fabricated and installed, an occupancy space of the cooling units may be increased, and since the weight thereof is increased, power consumption of a battery may be increased.

SUMMARY OF THE INVENTION

An aspect of the present invention provides an electric motor capable of reducing power consumption of a battery and increasing a traveling distance of a vehicle by reducing weight thereof.

Another aspect of the present invention provides an electric motor capable of reducing an installation space to thereby utilize the space, and an electrical vehicle having the same.

According to an aspect of the present invention, there is provided an electric motor including: a stator; a rotor disposed to be rotatable with respect to the stator; and a cooling unit including a cooling fluid and disposed between the stator and the inverter device to cool the stator and the inverter device.

The cooling unit may include: a body having an inner face in contact with the stator such that heat is transmittable; and a cooling fluid accommodation space formed within the body to temporarily accommodate a cooling fluid.

The stator may have a cylindrical shape.
The body may have a circular inner shape.
An outer face of the body may have a polygonal shape.

The electric motor may further include: a frame disposed at an outer side of the cooling unit to support the inverter device.

The frame may have a cylindrical shape with both sides thereof open along an axial direction.

The electric motor may further include: brackets coupled to block both end portions of the frame to support a rotational shaft of the rotor.

The inverter device may include a DC-link capacitor, a PCB, and a switching element, and the frame may include a DC-link capacitor support portion, a PCB support portion, and a switching element support portion in order to support the DC-link capacitor, the PCB, and the switching element.

The DC-link capacitor support portion may be formed at a lower portion of the frame, and the switching element support portion may be formed at an upper portion of the frame.

The electric motor may further include: a cover disposed at an outer side of the frame and supporting the inverter device cooperatively with the frame.

The cover may include protrusions and depressions in order to increase a surface area.

The protrusions and depressions may include a plurality of fins.

The cover may include a flow path along which a cooling fluid moves.

The flow path of the cover may be connected in parallel to the cooling unit.

According to another aspect of the present invention, there is provided an electric vehicle including a vehicle body; a battery provided in the vehicle body; and the foregoing electric motor connected to the battery and providing driving force to the vehicle body.

The electric vehicle may further include: a cooling fluid circulation unit for circulating the cooling fluid by way of the cooling unit.

The cooling fluid circulation unit may include a fluid pipe forming a flow path of the cooling fluid and a flow acceleration unit for accelerating a movement of the cooling fluid.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiments of the present invention will be described in detail with reference to the accompanying drawings.

Figure 1:
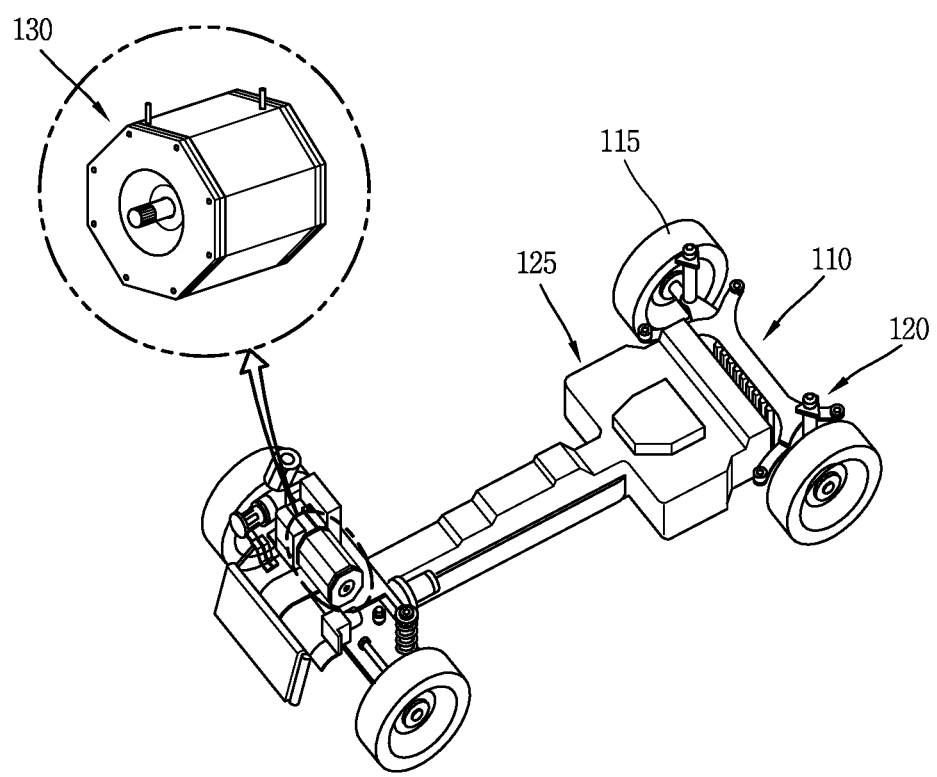
FIG. 1 is a schematic view showing the configuration of an electric vehicle according to an embodiment of the present invention.

As shown in FIG. 1, an electric vehicle having an electric motor according to an exemplary embodiment of the present invention may include a vehicle body 110, a battery 125 provided in the vehicle body 110, and an electric motor 130 connected with the battery 125 to provide driving force to the vehicle body 110.

A passenger space (not shown) allowing a driver, and so on, to get on may be provided at an upper area of the vehicle body 110.

A plurality of wheels 115 allowing the vehicle to run may be provided at the vehicle body 110.

The wheels 115 may be disposed on front and rear sides of the vehicle body 110.

A suspension device 120 may be provided between the vehicle body 110 and the wheels 115 in order to lessen vibration and/or impact transferred from the road surface when the vehicle is running on the road.

Figure 2:
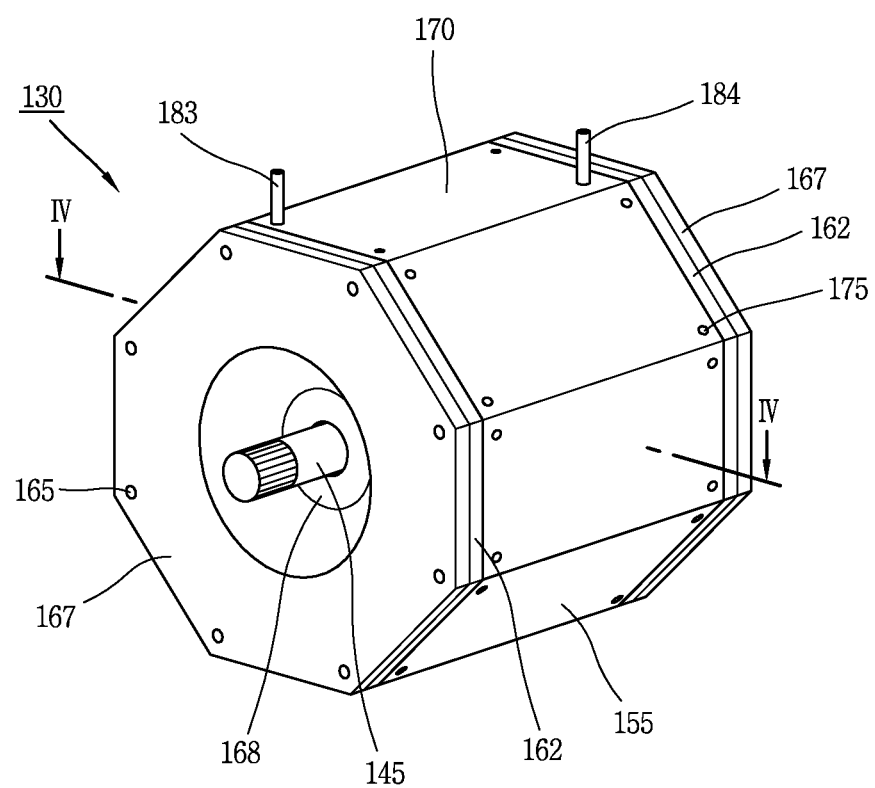
FIG. 2 is a perspective view of an electric motor of FIG. 1.
Figure 3:
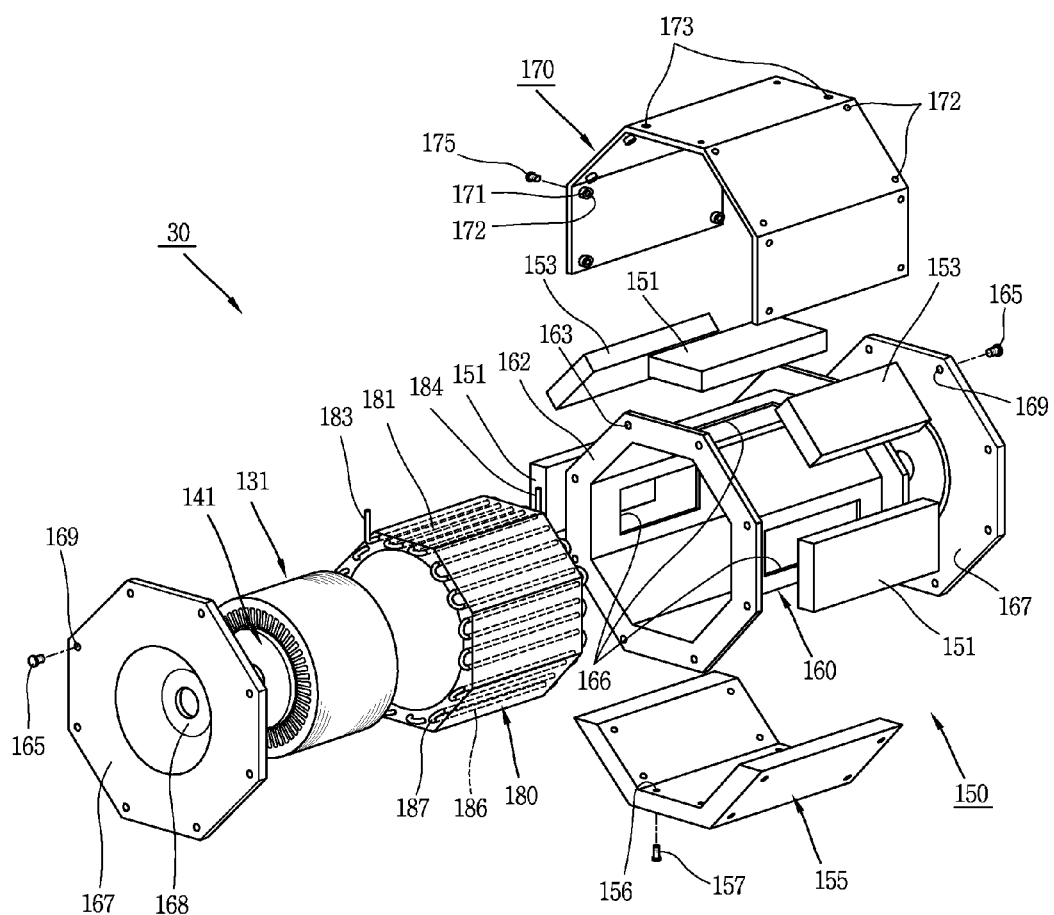
FIG. 3 is an exploded perspective view of the electric motor of FIG. 2.
Figure 4:
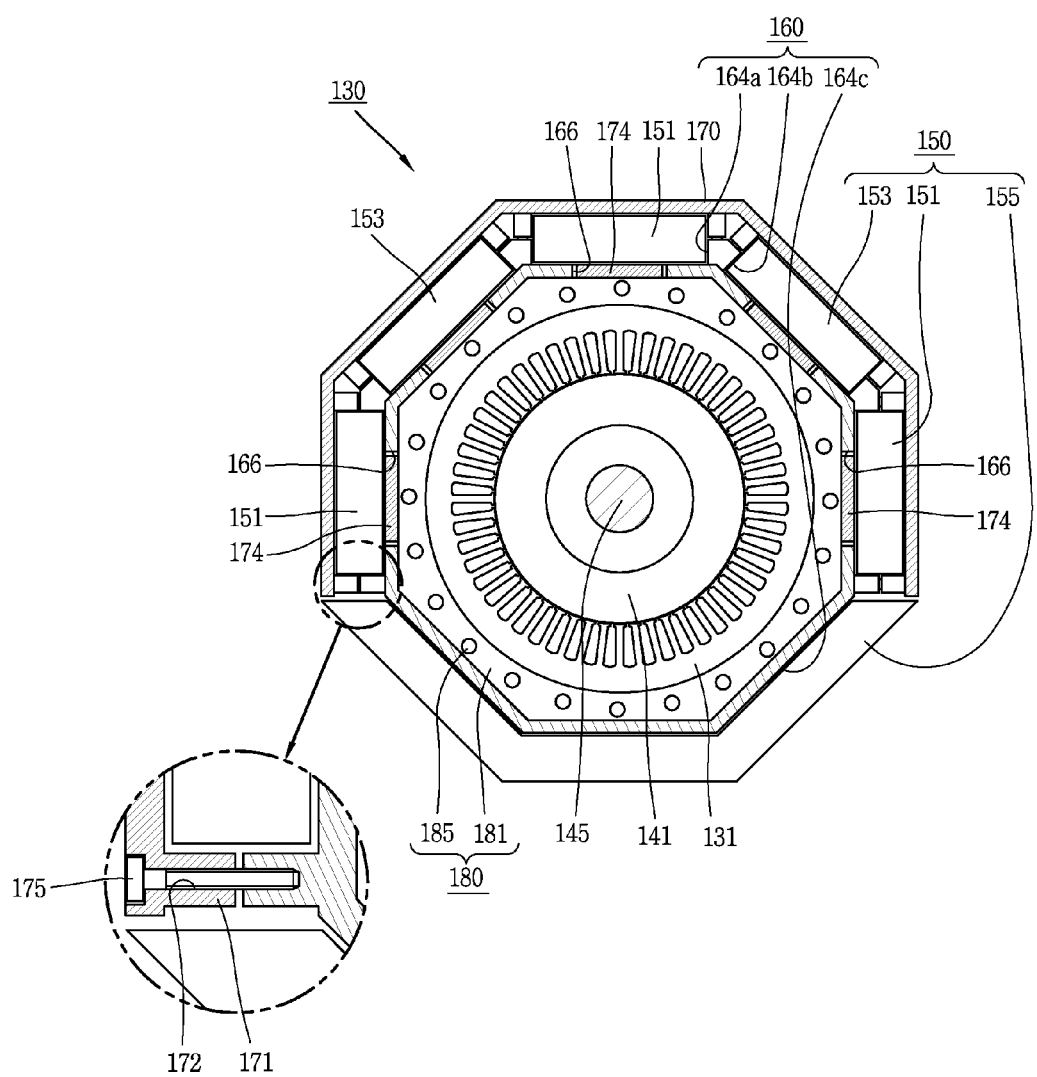
FIG. 4 is a sectional view taken along line IV-IV of FIG. 2.

Meanwhile, as shown in FIGS. 2 through 4, the electric motor 130 may include a stator 131, a rotor 141 disposed to be rotatable with respect to the stator 131, an inverter device 150 disposed at an outer side of the stator 131, and a cooling unit 180 including a cooling fluid and disposed between the stator 131 and the inverter device 150 to cool the stator 131 and the inverter device 150.

Although not shown, the stator 131 may include a stator core and a stator coil wound around the stator core. The stator core may be formed to have a cylindrical shape (inner and outer faces thereof have a circular shape).

The rotor 141 may be rotatably accommodated within the stator 131.

A rotational shaft 145 may be provided at the center of the rotor 141. Here, the stator 131 and the rotor 141 may be configured to be rotatable when 3-phase AC power is applied.

The cooling unit 180 may be provided at an outer side of the stator 131. Accordingly, the stator 131 may be cooled. Here, the stator 131 and the cooling unit 180 may be coupled according to a method such as press-fitting, or the like.

The cooling unit 180 may include a body 181 having an inner face in contact with the stator 131 such that heat is transmittable, and a cooling fluid accommodation space 185 formed within the body 181 to temporarily accommodate a cooling fluid. Accordingly, the cooling fluid can be heat-exchanged with the stator 131 to cool the stator 131.

The body 181 may be made of a thermally conductive member. Accordingly, the cooling fluid and the stator 131 can be smoothly heat-exchanged.

The inner face of the body 181 may have a circular shape so as to be in surface-contact with an outer diameter of the stator 131.

An outer face of the body 181 may have a polygonal shape.

The cooling fluid accommodation space 185 may be provided within the body 181 in order to temporarily accommodate (or store) the cooling fluid.

The cooling fluid accommodation space 185 may include linear section portions 186 formed in a penetrative manner in an axial direction of the body 181 and curved section portions 187 connecting the linear section portions 186.

The linear section portions 186 are separately disposed at certain intervals along a circumferential direction of the body 181.

The curved section portions 187 may be disposed to be protruded from both end portions of the body 181.

The curved section portions 187 may connect end portions of two linear section portions 186 disposed to be adjacent to each other, such that they communicate. Accordingly, the linear section portions 186 and the curved section portions 187 may constitute a single cooling flow path.

The body 181 may include a cooling fluid inflow portion 183 and a cooling fluid outflow portion 184 allowing a cooling fluid to flow in or flow out, respectively. For example, the cooling fluid inflow portion 183 may be provided at a low heat generation area of the body 181, and the cooling fluid outflow portion 184 may be provided at a high heat generation area of the body 181. For example, the cooling fluid inflow portion 183 and the cooling fluid outflow portion 184 may be provided on an upper region of the body 181.

Figure 7:
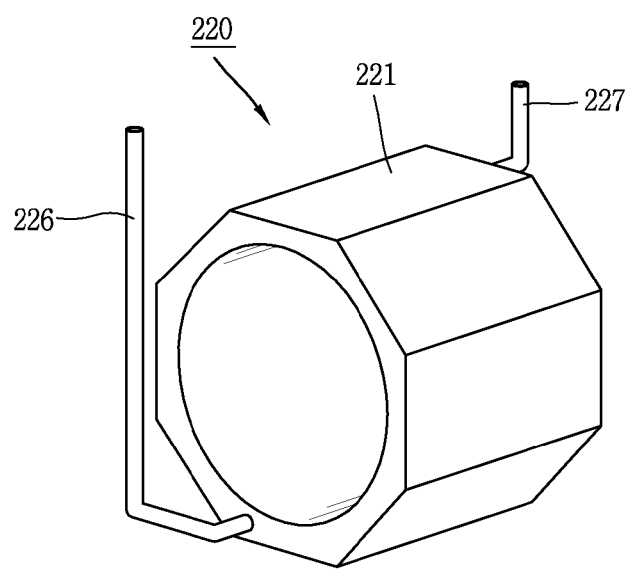
FIG. 7 is a modification of a cooling unit of FIG. 3.
Figure 8:
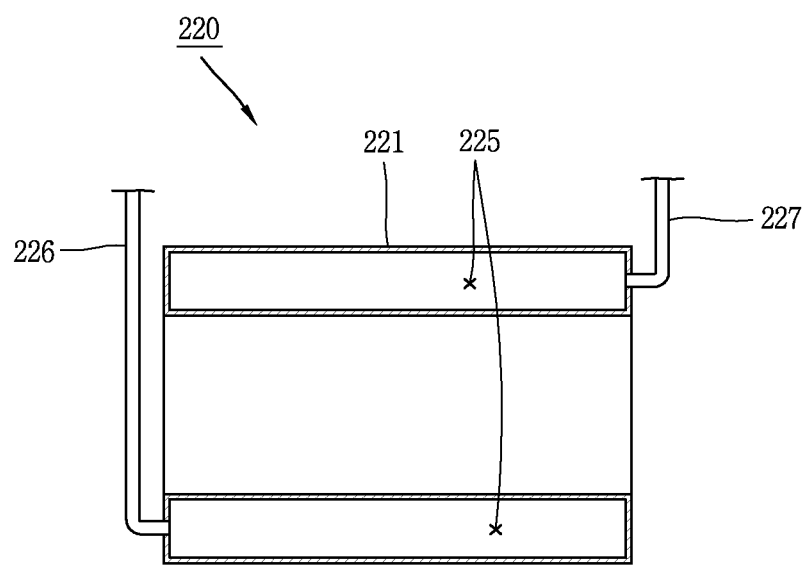
FIG. 8 is a cross-sectional view of FIG. 7.

Meanwhile, as shown in FIGS. 7 and 8, a cooling unit 220 may include a body 221 including an inner face having a circular shape and an outer face having a polygonal shape and a cooling fluid accommodation space 225 which integrally communicates overall within the body 221. For example, the cooling fluid accommodation space 225 may be formed to have a certain thickness between an inner diameter face and an outer face of the body 221.

A cooling fluid inflow portion 226 may be provided at a lower portion of the cooling fluid accommodation space 225 to allow a cooling fluid to be introduced therethrough, and a cooling fluid outflow portion 227 may be formed at an upper portion of the cooling fluid accommodation space 225 to allow the cooling fluid to flow out therethrough. Accordingly, a cooling fluid having a relatively low temperature is introduced to a lower portion of the cooling fluid accommodation space 225 and heat-exchanged to perform a cooling operation. And then, the cooling fluid having a relatively increased temperature may flow out from an upper portion of the cooling fluid accommodation space 225 to the outside. According to this configuration, a component having a relatively small heating value (e.g., a PCB 153) may be disposed at a lower region of the cooling fluid accommodation space 225, and a component having a relatively high heating value (e.g., a switching element 151) may be disposed at an upper region, of the cooling fluid accommodation space 225, which has a relatively high temperature, thus effectively cooling heat generating components.

The inverter device 150 may be provided at an outer side of the cooling unit 180. Accordingly, the stator 131 and the inverter device 150 can be simultaneously cooled by the cooling unit 180.

Compared with the related art in which a plurality of cooling units for individually cooling the stator 131 and the inverter device 150 are provided, so the volume and weight of the cooling units are increased, in the present embodiment, the electric motor 130 includes the cooling unit 180 simultaneously cooling both the stator 131 and the inverter device 150, so the weight and volume of the cooling unit 180 can be reduced. Accordingly, the reduction in the weight of the cooling unit 180 can lead to a reduction in the overall weight of the electric vehicle, reduction in power consumption of the battery 125, and increasing of a traveling distance. In addition, since the volume of the cooling unit 180 is reduced, the space in which the electric motor 130 is installed can be utilized or the space itself in which the electric motor 130 is installed may be reduced.

The inverter device 150 may be configured to include, for example, a plurality of switching elements 151 converting DC power into high frequency AC power, PCBs 153 including a control program, and a DC-link capacitor 155 canceling noise of DC power and providing the DC power without noise to the switching elements 151. The switching elements 151 may be configured as an insulated gate bipolar transistor (IGBT).

A frame 160 may be provided between the cooling unit 180 and the inverter device 150 in order to support the inverter device 150.

The frame 160 may be coupled to the cooling unit 180.

The frame 160 may have a section having a polygonal shape corresponding to the shape of the cooling unit 180. For example, the cooling unit 180 may have an outer face having an octagonal shape, and the frame 160 may have a section having an octagonal shape.

Both sides of the frame 160 may be open.

A flange 162 may be formed at both end portions of the frame 160. The flange 162 may extend to the outside in a radial direction and extend in a circumferential direction.

Brackets 167 may be provided at both end portions of the frame 160. The respective brackets 167 may be fixedly coupled to the frame 160. For example, the respective brackets 167 may be configured to be fastened to both end portions (flange portions 162) of the frame 160 by a plurality of fixing bolts 165. A plurality of coupling portions 163 may be formed on the flange portion 162 to allow the fixing bolts 165 to be coupled therethrough.

A plurality of through holes 169 may be formed on the respective brackets 167 by penetrating the plane.

A shaft support portion 168 rotatably supporting the rotational shaft 145 may be provided in a central region of the respective brackets 168. For example, a bearing (not shown) may be provided at the shaft support portion 168. Here, the cooling unit 180 may be insertedly coupled according to a method such as press-fitting, or the like, within the frame 160.

Meanwhile, the switching elements 151 may be provided at an upper region of the frame 160.

The DC-link capacitor 155 may be provided at a lower region of the frame 160. Accordingly, heat generated from the switching elements 151 having a relatively high heating value is restrained to be transferred to a different component, e.g., the DC-link capacitor 155.

The PCB 153 may be provided on the side or at upper region of the frame 160.

Here, the frame 160 may include a switching element support portion 164a, a PCB support portion 164b, and a DC-link capacitor support portion 164c in order to support the switching element 151, the PCB 153, and the DC-link capacitor 155, respectively. The switching element support portion 164a, the PCB support portion 164b, and the DC-link capacitor support portion 164c may be formed to correspond to the shapes of the switching element 151, the PCB 153, and the DC-link capacitor 155.

A plurality of switching elements 151 may be provided. For example, three switching elements 151 may be provided. Each of the switching elements 151 may be formed to have a width corresponding to one side of the frame 160.

A plurality of PCBs 153 may be provided. For example, two PCBs 153 may be provided. Each of the PCBs 153 may be formed to have a width corresponding to one side of the frame 160.

The DC-link capacitor 155 may be formed to be bent to have a size corresponding to, for example, three sides of the frame 160.

Here, the switching elements 151 may be disposed to be spaced apart by a certain distance. For example, the switching elements 151 may be disposed at an upper portion of the frame 160 and both sides of the frame 160, and the PCBs 153 may be disposed between the switching elements 151. Alternatively, the switching element 151 may be disposed at the upper portion of the frame 160 and both sides of the frame 160, and two PCBs 153 may be disposed on two sides of the frame 160, respectively.

Through portions 166 may be formed on the switching element support portion 164a such that they penetrate the plate surface. Accordingly, the switching element 151 and the stator (coil) 131 may be electrically connected. Here, the through portion 166 may be formed to be larger than the switching element 151. Accordingly, an inner circumferential surface of the switching element 151 may be in surface-contact with an outer surface of the cooling unit 180.

Also, a heat transmission member 174 may be interposed between the cooling unit 180 and the switching element 151. In detail, the heat transmission member 174 may be provided within the through portion 166 such that one side thereof is in contact with the cooling unit 180 and the other side thereof is in contact with the switching element 151. Accordingly, heat transmission can be smoothly made between the cooling unit 180 and the switching element 151, accelerating cooling of the switching element 151.

Meanwhile, a cover 170 may be coupled to the frame 160.

For example, the cover 170 may be configured to be coupled horizontally to the axial direction of the rotational shaft 145 from the side of the frame 160. The cover 170 may be integrally coupled to the frame 160 by a plurality of fastening members 175. The fastening members 175 may be implemented as, for example, screws or bolts.

A plurality of insertion holes 172 may be formed in a penetrative manner on the cover 170 to allowing the fastening members 174 to be inserted therein. The insertion holes 172 may be formed to penetrate through boss portions 171 protruded from a rear surface of the cover 170.

Through holes 173 may be formed on the cover 170 to allow the cooling fluid inflow portion 183 and the cooling fluid outflow portion 184 to be drawn out therethrough.

The cover 170 may be configured to have a size and a shape, for example, corresponding to five sides of the frame 160. In the present embodiment, it is illustrated that the cover 170 is configured to have a size and a shape that can be disposed at an outer side of the switching elements 151 and the PCBs 153.

Figure 9:
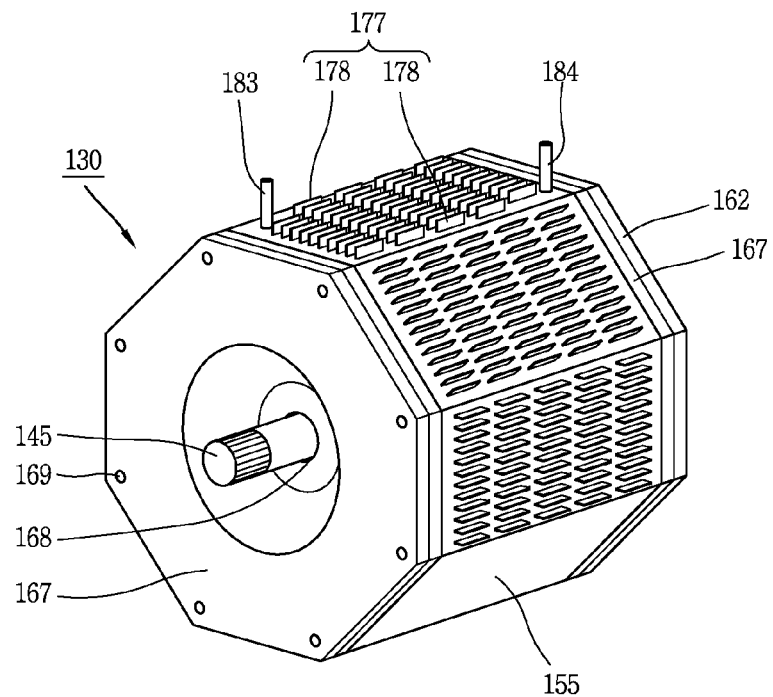
FIG. 9 is a view showing a modification of a cover of the electric vehicle of FIG. 1.
Figure 10:
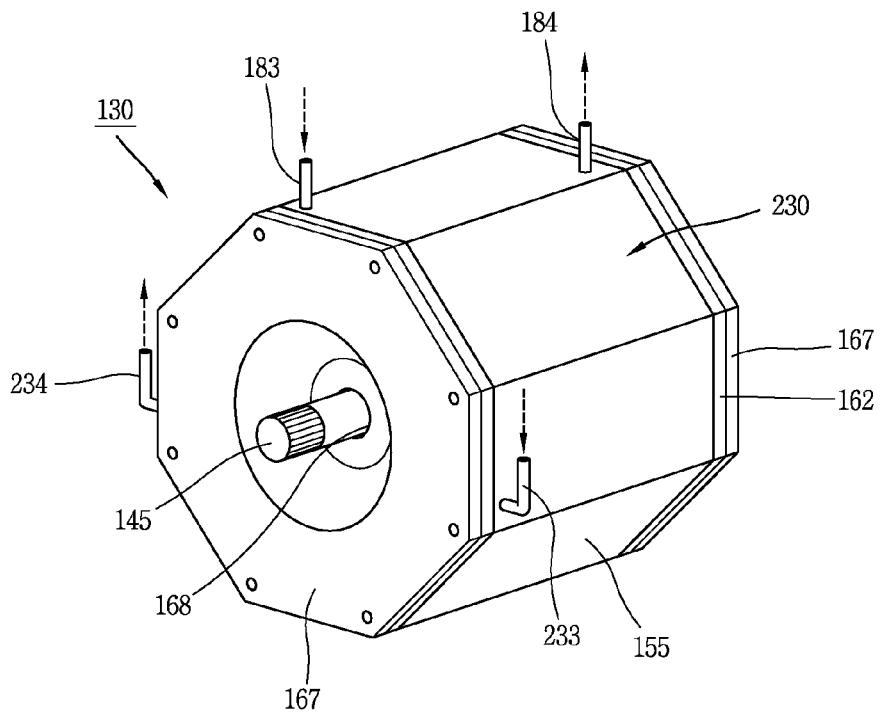
FIG. 10 is a perspective view of an electric motor of an electric vehicle according to another embodiment of the present invention.

Meanwhile, the cover 170 may be configured such that a heat transfer area is increased. For example, as shown in FIG. 9, protrusion and depressions 177 may be formed on an outer face of the cover 170 to increase an air contact area. Accordingly, heat dissipation (cooling) of the cover 170 can be accelerated. The protrusion and depressions 177 may be configured, for example, as a plurality of fins 178.

The DC-link capacitor 155 may be configured to be directly coupled to the frame 160 by fastening members 157. A plurality of insertion holes 156 may be formed in a penetrative manner on the DC-link capacitor 155 to allow the fastening members 157 to be inserted therein. Here, although not shown, the DC-link capacitor 155 may be electrically connected to the battery 125 and the switching elements 151.

Meanwhile, the electric motor 130 may include a cooling fluid circulation unit 190 for circulating the cooling fluid. Accordingly, the cooling fluid having a temperature increased while cooling the stator 131 and the inverter device 150 can be cooled while being circulated.

Figure 5:
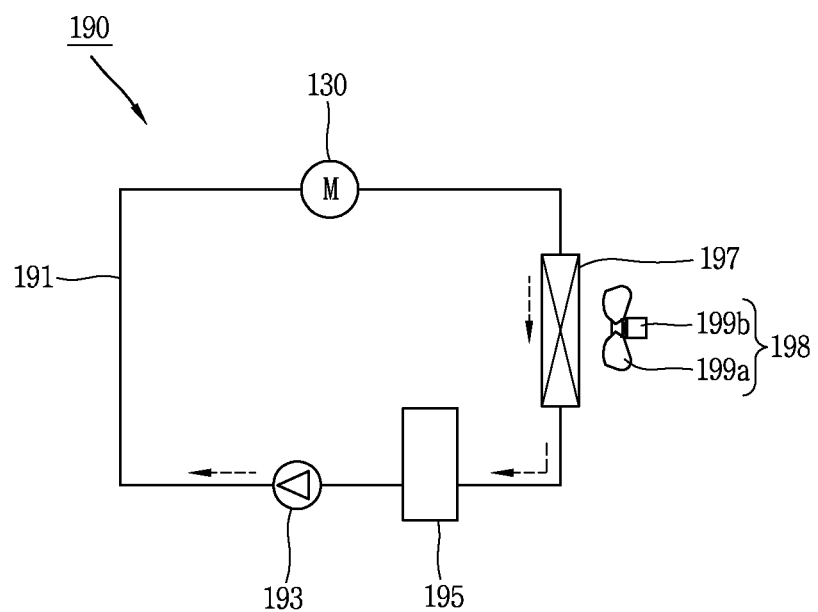
FIG. 5 is a view showing the configuration of a cooling fluid circulation unit of the electric vehicle of FIG. 1.

For example, as shown in FIG. 5, the cooling fluid circulation unit 190 may include a fluid pipe 191 forming a flow path of the cooling fluid and a flow acceleration unit for accelerating a movement of the cooling fluid. The flow acceleration unit may be configured as, for example, a pump 193 pumping the cooling fluid.

A tank 195 for temporarily storing the cooling fluid may be provided at one side of the pump 193.

The fluid pipe 191 may be connected to the cooling fluid inflow portion 183 and the cooling fluid outflow portion 184 such that they communicate with each other. Accordingly, the cooling fluid can be circulated by way of the cooling unit 180.

Figure 13:
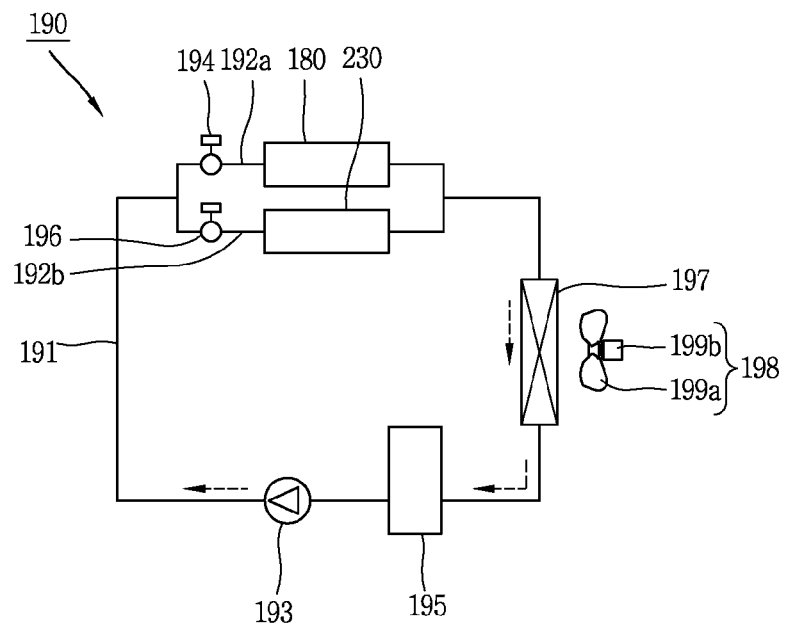
FIG. 13 is a view showing the configuration of a cooling fluid circulation unit of the electric vehicle of FIG. 10.

The cooling fluid circulation unit 190 may include a radiator 197 in which the cooling fluid is heat-exchanged with air so as to be cooled. A cooling fan 198 may be provided at one side of the radiator 197 in order to accelerate a movement of air which is in contact with the radiator 197 so as to be heat-exchanged. The cooling fan 198 may be configured to be driven by electric force. For example, as shown in FIG. 13, the cooling fan 198 may be configured to include rotary blades 199a and an electric motor 199b.

Meanwhile, the electric vehicle according to the present embodiment may be configured to include a controller 210 which can be implemented as a microprocessor by including a control program.

The controller 210 may be configured to sense temperature of the cooling fluid to control a flow rate (or a movement speed) of the cooling fluid.

Figure 6:
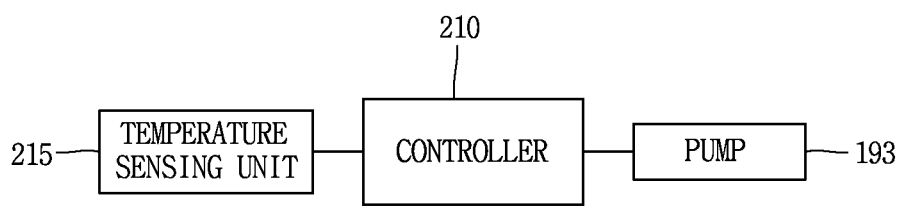
FIG. 6 is a control block diagram of the of the electric vehicle of FIG. 1.

As shown in FIG. 6, a temperature sensing unit 215 for sensing temperature of the cooling fluid and a pump 193 may be connected to the controller 210 and controlled. Here, the temperature sensing unit 215 may be provided, for example, in the cooling unit 180.

When the temperature of the cooling fluid sensed by the temperature sensing unit 215 is higher than a pre-set temperature, the controller 210 may control the pump 193 to increase the flow rate of the cooling fluid. The controller 210 may increase revolutions per minute (RPM) of the pump 193 in order to increase the flow rate of the cooling fluid. Conversely, the controller 210 may decrease RPM of the pump 193 in order to lower the temperature of the cooling fluid. Here, when the flow rate of the cooling fluid is increased, a temperature drop speed of the cooling fluid may become faster than a temperature increase speed of the cooling fluid, so the temperature of the cooling fluid can be lowered.

According to such a configuration, DC power provided from the battery 125 may be converted into 3-phase AC power by the inverter device 150. Power output from the inverter device 150 may be applied to the stator 131. When power is applied to the stator 131, the rotor 141 may rotate about the rotational shaft (by being centered thereon). Rotary force of the rotational shaft 145 may be transferred to the wheels 115, and accordingly, the vehicle body 110 may travel. While the electric motor 130 is being driven, high heat may be generated from the inverter device 150 and the stator 131.

Meanwhile, when a driving signal is input, the controller 210 may control the pump 193 to circulate the cooling fluid to cool the stator 131 and the inverter device 150. When the pump 193 is driven, the cooling fluid flows along the fluid pipe 191 and passes through the cooling unit 180 to simultaneously cool the stator 131 and the inverter device 150. The cooling fluid having a temperature increased while cooling the stator 131 and the inverter device 150 may be cooled while passing through the radiator 197.

The controller 210 may control the temperature sensing unit 215 to sense the temperature of the cooling fluid. When the sensed temperature of the cooling fluid exceeds a pre-set temperature, the controller 210 may increase the flow rate of the cooling fluid in order to lower the temperature of the cooling fluid. The controller 210 may increase the RPM of the pump 193 in order to increase the flow rate of the cooling fluid.

An electric vehicle according to another embodiment of the present invention will be described with reference to FIGS. 10 through 14.

The same and equivalent parts as those of the foregoing configuration will be omitted in illustration on the drawings but will be described by using the same reference numerals, and a repeated description thereof will be omitted.

As described above, the electric vehicle according to the present embodiment may include the vehicle body 110, the battery 125 provided in the vehicle body 110, and the electric motor 130 connected with the battery 125 to provide driving force to the vehicle body 110.

The electric motor 130 may include the stator 131, a rotor 141 disposed to be rotatable with respect to the stator 131, the inverter device 150 disposed at an outer side of the stator 131, and the cooling unit 180 including a cooling fluid and disposed between the stator 131 and the inverter device 150 to cool the stator 131 and the inverter device 150.

The cooling unit 180 may include the body 181 having an inner face in contact with the stator 131 such that heat is transmittable, and the cooling fluid accommodation space 185 formed within the body 181 to temporarily accommodate a cooling fluid.

The body 181 may include the cooling fluid inflow portion 183 and the cooling fluid outflow portion 184 allowing the cooling fluid to flow in or flow out, respectively.

The frame 160 may be provided between the cooling unit 180 and the inverter device 150 in order to support the inverter device 150.

The inverter device 150 may include the switching element 151, the PCB 153, and the DC-link capacitor 155.

The switching element 151 and the PCB may be disposed at the upper region and/or side of the frame 160, respectively.

The cover 230 may be provided at an upper side of the frame 160 in order to support the switching element 151 and the PCB 153.

Meanwhile, a flow path 231 may be formed in the cover 230 to allow the cooling fluid to move therealong.

Figure 11:
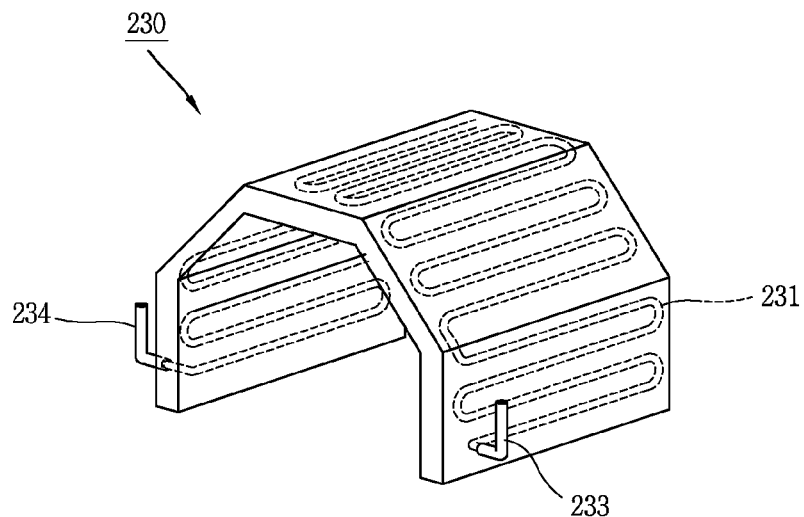
FIG. 11 is a perspective view of a cover of the electric vehicle of FIG. 10.
Figure 12:
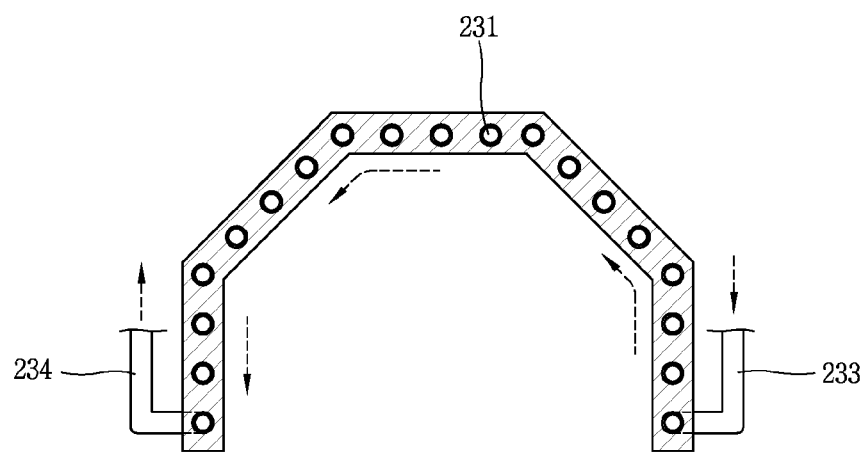
FIG. 12 is a cross-sectional view of the cover of FIG. 11.

As shown in FIGS. 11 and 12, the flow path 231 of the cover 230 may be formed, for example, in zigzags.

A cooling fluid inflow portion 233 and a cooling fluid outflow portion 234 may be formed on the cover 230 to allow the cooling fluid to flow in and flow out, respectively.

For example, the cooling fluid inflow portion 233 may be formed at one lower region of the cover 230 and the cooling fluid outflow portion 234 may be formed at another lower region of the cover 230.

The electric vehicle according to the present embodiment may include the cooling fluid circulation unit 190 for circulating the cooling fluid.

As shown in FIG. 13, the cooling fluid circulation unit 190 may include the fluid pipe 191 and the pump 193. A tank 195 may be provided at one side of the pump 193. The cooling fluid circulation unit 190 may include the radiator 197. The cooling fan 198 may be provided at one side of the radiator 197. The cooling fan 198 may include the rotary blades 199a and the motor (electric motor) 199b.

Meanwhile, the cover 230 may be connected to the fluid pipe 191.

For example, the flow path 231 of the cover 230 may be configured to be connected in parallel to the flow path of the cooling unit 180.

The cooling fluid circulation unit 190 may be configured to include a first branch flow path 192a and a second branch flow path 192b. For example, the cooling unit 180 is connected to the first branch flow path 192a, and the cover 230 may be connected to the second branch flow path 192b.

A first valve 194 is provided at the first branch flow path 192a to open and close the first branch flow path 192a, and a second valve 196 may be provided at the second branch flow path 192bn in order to open and close the second branch flow path 192b.

Meanwhile, the electric vehicle according to the present embodiment may include the controller 210.

The controller 210 may be configured to sense the temperature of the cooling fluid and adjust a flow rate of the cooling fluid based on the temperature sensing result.

Figure 14:
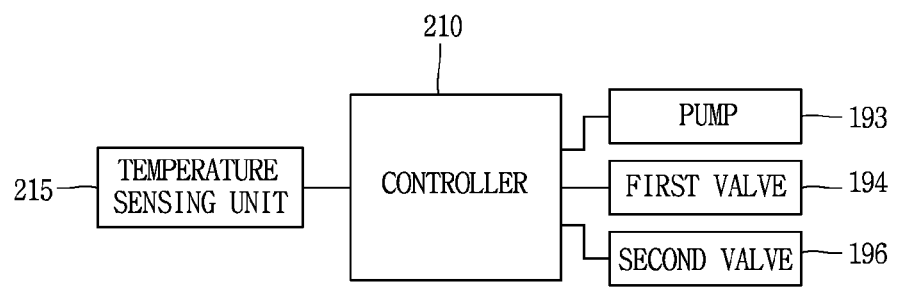
FIG. 14 is a control block diagram of the electric vehicle of FIG. 10.

As shown in FIG. 14, the temperature sensing unit 215 and the pump 193 may be connected to the controller 210 and controlled.

When the sensed temperature of the cooling fluid exceeds a pre-set temperature, the controller 210 may control the pump 193 to increase the flow rate of the cooling fluid.

Meanwhile, the controller 210 may be configured to adjust the flow path of the cooling fluid based on the temperature sensing result of the cooling fluid.

The first valve 194 and the second valve 196 may be connected to the controller 210 such that they can be controlled.

For example, the controller 210 may open both the first valve 194 and the second valve 196 in order to quickly cool the cooling fluid. Accordingly, the cooling fluid, passing through the cooling unit 180 and the cover 230, respectively, can quickly cool the stator 131 and the inverter device 150. Here, the controller 210 may increase the RPM of the pump 193 in order to increase the flow rate of the cooling fluid.

Also, when the sensed temperature of the cooling fluid is lower than another pre-set temperature according to the sensing result of the temperature sensing unit 215, the controller 210 may provide control to open the first valve 194 and close the second valve 196 to allow the cooling fluid to pass through the cooling unit 180.

According to the configuration, when a driving signal for driving the electric motor 130 is input, DC power provided from the battery 125 may be converted into AC power by the inverter device 150. The AC power may be provided to the stator 131, and the rotor 141 may be rotated according to an interaction of the stator 131 and the rotor 141.

Meanwhile, when the driving signal is input, the controller 210 may drive the pump 193 in order to cool the inverter device 150 and the stator 131. The cooling fluid pumped by the pump 193 moves along the fluid pipe 191 and passes through the cooling unit 180, cooling the stator 131 and the inverter device 150.

The controller 210 senses the temperature of the cooling fluid by the temperature sensing unit 215, and in order to quickly cool the cooling fluid, the controller 210 may control the first and second valves 194 and 196 to simultaneously open the first branch flow path 192a and the second branch flow path 192b. Accordingly, the cooling fluid, passing through the cooling unit 180 and the cover 230, can quickly cool the stator 131 and the inverter device 150.

In order to quickly cool the cooling fluid, the controller 210 may increase the RPM of the pump 193. Accordingly, the flow rate of the cooling fluid can be increased to further quickly cool the stator 131 and the inverter device 150.

As described above, according to embodiments of the present invention, since the inverter device is disposed at an outer side of the stator and the cooling unit is disposed between the stator and the inverter device to integrally configure the electric motor and the inverter device, the weight can be reduced, and thus, power consumption of the battery can be reduced and the traveling distance of the vehicle can be increased.

Also, since the electric motor and the inverter device can be simultaneously cooled by the cooling unit, the number of installation of the cooling units can be reduced, and since the volume is reduced, the space occupied by the cooling unit can be considerably reduced. Accordingly, the space in which the electric motor is installed can be utilized or the space itself in which the electric motor is installed can be reduced.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An electric motor comprising:
   a stator;
   a rotor disposed to be rotatable with respect to the stator;
   a cooling unit including a body having an inner surface, an outer surface, and accommodation space to accommodate cooling fluid, the stator disposed in the inner surface of the body and the outer surface of the body capable of accommodating an inverter device; and
   a frame disposed at the outer surface of the cooling unit to support the inverter device,
   wherein the outer surface of the body has a polygonal shape,
   wherein the inverter device comprises a DC-link capacitor, a PCB, and a switching element, and the frame comprises a DC-link capacitor support portion, a PCB support portion, and a switching element support portion in order to support the DC-link capacitor, the PCB, and the switching element, and
   wherein the DC-link capacitor support portion is formed at a lower portion of the frame, and the switching element support portion and the PCB support portion are formed above the DC-link capacitor support portion.

2. The electric motor of claim 1, wherein the accommodation space comprises linear section portions formed in a penetrative manner in an axial direction of the body and connecting section portions connecting the linear section portions.

3. The electric motor of claim 2, wherein the linear section portions are disposed at certain intervals along a circumferential direction of the body and the connecting section portions separately connect end portions of two linear section portions adjacent to each other to form a single cooling flow path.

4. The electric motor of claim 3, wherein the linear section portions and the connecting section portions are single continuous unit.

5. The electric motor of claim 1, wherein the body is made of a thermally conductive material.

6. The electric motor of claim 1, wherein a cooling fluid inflow portion is provided at a lower portion of the body and a cooling fluid outflow portion is provided at an upper portion of the body.

7. The electric motor of claim 1, wherein a cooling fluid inflow portion is provided at a low heat generation area of the body, and the cooling fluid outflow portion is provided at a high heat generation area of the body.

8. The electric motor of claim 1, wherein the switching element support portion includes a through portion and a heat transmission member is disposed at the through portion to be interposed between the cooling unit and the switching unit.

9. The electric motor of claim 1, further comprising:
a cover disposed at an outer side of the frame and supporting the inverter device cooperatively with the frame,
wherein the cover comprises protrusions and depressions in order to increase a surface area or a flow path along which the cooling fluid can flow therethrough.

10. The electric motor of claim 1, wherein the switching element support portion is spaced apart from an upper portion of the frame along a circumferential direction of the rotor, and
wherein the PCB support portion is disposed between the adjacent switching element support portions.

11. The electric motor of claim 1, wherein the frame has an outer surface in an octagonal shape,
wherein the switching element support portion and the PCB support portion are formed to correspond to one side of the frame, respectively, and
wherein the DC-link capacitor support portion is formed to correspond to three sides of the frame.

12. An electric vehicle comprising:
a vehicle body;
a battery provided in the vehicle body; and
an electric motor including,
a stator,
a rotor disposed to be rotatable with respect to the stator,
a cooling unit including a cooling unit body having an inner surface, an outer surface, and accommodation space to accommodate cooling fluid, the stator disposed in the inner surface of the cooling unit body and the outer surface of the cooling unit body capable of accommodating an inverter device, and a frame disposed at the outer surface of the cooling unit to support the inverter device,
wherein the electric motor is connected to the battery and providing driving force to the vehicle body,
wherein the outer surface of the cooling unit body has a polygonal shape,
wherein the inverter device comprises a DC-link capacitor, a PCB, and a switching element, and the frame comprises a DC-link capacitor support portion, a PCB support portion, and a switching element support portion in order to support the DC-link capacitor, the PCB, and the switching element, and
wherein the DC-link capacitor support portion is formed at a lower portion of the frame, and the switching element support portion and the PCB support portion are formed above the DC-link capacitor support portion.

13. The electric vehicle of claim 12, further comprising:
a cooling fluid circulation unit to circulate the cooling fluid by way of the cooling unit.

14. The electric vehicle of claim 13, wherein the cooling fluid circulation unit comprises a fluid pipe forming a flow path of the cooling fluid and a flow acceleration unit to accelerate a movement of the cooling fluid.

15. The electric vehicle of claim 14, further comprising:
a controller; and
a temperature sensing unit to sense a temperature of the cooling fluid,
wherein the controller controls the flow acceleration unit based on the sensed temperature.

16. The electric vehicle of claim 12, wherein the switching element support portion is spaced apart from an upper portion of the frame along a circumferential direction of the rotor, and
wherein the PCB support portion is disposed between the adjacent switching element support portions.

17. The electric vehicle of claim 12, wherein the frame has an outer surface in an octagonal shape,
wherein the switching element support portion and the PCB support portion are formed to correspond to one side of the frame, respectively, and
wherein the DC-link capacitor support portion is formed to correspond to three sides of the frame.

* * * * *